(12) United States Patent
Yang

(10) Patent No.: US 10,317,885 B2
(45) Date of Patent: Jun. 11, 2019

(54) SAFETY CIRCUIT, BACK-UP SAFETY CIRCUIT AND INDUSTRIAL ROBOT SAFETY CONTROL SYSTEM

(71) Applicant: SHENZHEN A&E INTELLIGENT TECHNOLOGY INSTITUTE CO., LTD., Shenzhen, Guangdong (CN)

(72) Inventor: Shusheng Yang, Guangdong (CN)

(73) Assignee: SHENZHEN A&E INTELLIGENT TECHNOLOGY INSTITUTE CO., LTD., Shenzhen (CN)

( * ) Notice: Subject to any disclaimer, the term of this patent is extended or adjusted under 35 U.S.C. 154(b) by 188 days.

(21) Appl. No.: 15/550,031

(22) PCT Filed: Jan. 29, 2016

(86) PCT No.: PCT/CN2016/072762
§ 371 (c)(1),
(2) Date: Nov. 1, 2017

(87) PCT Pub. No.: WO2016/127830
PCT Pub. Date: Aug. 18, 2016

(65) Prior Publication Data
US 2018/0173204 A1 Jun. 21, 2018

(30) Foreign Application Priority Data
Feb. 11, 2015 (CN) .......................... 2015 1 0071296

(51) Int. Cl.
*G05B 19/418* (2006.01)
*G05B 19/04* (2006.01)
(Continued)

(52) U.S. Cl.
CPC ............ *G05B 19/418* (2013.01); *G05B 9/02* (2013.01); *G05B 19/04* (2013.01);
(Continued)

(58) Field of Classification Search
CPC combination set(s) only.
See application file for complete search history.

(56) References Cited

U.S. PATENT DOCUMENTS 4,564,833 A * 1/1986 Seko .................... B60K 28/066
180/272
5,578,987 A * 11/1996 XuYang ................. G08B 29/10
340/12.32
(Continued)

FOREIGN PATENT DOCUMENTS

CN 103618631 A 3/2014
CN 103777617 A 5/2014
(Continued)

*Primary Examiner* — Travis R Hunnings

(57) ABSTRACT

The present disclosure provides an industrial robot safety control system, a back-up safety circuit and a safety module. The safety module includes a first safety circuit and a second safety circuit. The first safety circuit and the second safety circuit receive a warning signal at a same time. The first safety circuit is configured to respond to the warning signal. The second safety circuit include a delay system and an event response circuit. The delay system sets a time delay when receiving the warning signal, wherein, when the delay system does not receive a first control signal indicating that the first safety circuit has responded to the warning signal during the time delay, the delay system controls the event response circuit to respond to the warning signal. The present disclosure may help avoid the problem of common mode failure of the back-up safety mechanism.

20 Claims, 2 Drawing Sheets

(51) Int. Cl.
*G05B 9/02* (2006.01)
*G05B 19/042* (2006.01)
(52) U.S. Cl.
CPC .............. *G05B 19/0428* (2013.01); *G05B 2219/25314* (2013.01); *Y02P 90/02* (2015.11)

(56) References Cited

U.S. PATENT DOCUMENTS

| | | | | |
|---|---|---|---|---|
| 5,999,089 A | * | 12/1999 | Carlson | G08B 1/08 340/328 |
| 7,126,474 B2 | * | 10/2006 | Ingram | G07F 9/02 340/545.6 |
| 2010/0265086 A1 | * | 10/2010 | Olson | B65D 55/028 340/691.6 |

FOREIGN PATENT DOCUMENTS

| | | |
|---|---|---|
| CN | 204068263 U | 12/2014 |
| JP | 1987221008 A | 9/1987 |

* cited by examiner

SAFETY CIRCUIT, BACK-UP SAFETY CIRCUIT AND INDUSTRIAL ROBOT SAFETY CONTROL SYSTEM

CROSS-REFERENCE TO RELATED APPLICATIONS

The present application is a 35 U.S.C. § 371 National Phase conversion of International (PCT) Patent Application No. PCT/CN2016/072762, filed on Jan. 29, 2016, which claims foreign priority of Chinese Patent Application No. 201510071296.0, filed on Feb. 11, 2015 in the State Intellectual Property Office of China, the contents of all of which are hereby incorporated by reference.

TECHNICAL FIELD

The present disclosure generally relates to the field of industrial robot control system, and in particular relates to a back-up safety circuit, a safety module and an industrial robot control safety control system.

BACKGROUND

The industrial robot control safety system must provide a back-up of the fault response link according to the specifications of industrial robot. When the main fault response link fails, the back-up link is enabled. The normal and the back-up fault response links serve as double protection, which is well known as the safety mechanism of industrial robot. The back-up link is also called safety module.

In prior art, duplicating the safety function module is a common approach. The input ports of the two modules receive same signals. The output ports (generally a contactor for controlling strong current) are connected in series to control the power switch, e.g. a contactor. When a safety related warning occurs, the two modules respond to the warning at the same time to, for example, cut off the power supply. Therefore, the two modules back up for each other such that when one of the two modules fails, the other may still respond effectively to achieve safety protection.

The two safety circuits as above-described are substantially the same and work at the same time. Subsequently the circuit aging of the two safety circuits may be synchronous such that the two circuits may both fail at the time, which leads to a safety problem. Besides, the redundant design of two systems may lead to waste of energy and materials.

SUMMARY

The present disclosure provides an industrial robot safety control system, a back-up safety circuit and a safety module so as to avoid the problem of common mode failure of the back-up safety mechanism.

To solve the above-mentioned problem, a technical scheme adopted by the present disclosure is to provide a safety module, comprising a first safety circuit and a second safety circuit, wherein the first safety circuit and the second safety circuit receive a warning signal at a same time; the first safety circuit is configured to respond to the warning signal in real time; the second safety circuit comprises a delay system and an event response circuit, the delay system sets a time delay when receiving the warning signal, wherein, when the delay system does not receive a first control signal indicating that the first safety circuit has responded to the warning signal during the time delay, the delay system controls the event response circuit to respond to the warning signal.

In one embodiment, the delay system comprises a delay circuit and a first logic circuit, the delay circuit responds to the warning signal and outputs a second control signal to the first logic circuit after the time delay, wherein when the first logic circuit receives only the second control signal and does not receive the first control signal during the time delay, the first logic circuit generates a third control signal for controlling the event response circuit to respond to the warning signal; and when the first logic circuit receives the first control signal during the time delay, the first logic circuit does not generate the third control signal.

In one embodiment, the delay system further comprises a second logic circuit, the second logic circuit is connected to the delay circuit and configured to perform logical operations on a plurality of input signals, wherein when at least one of the plurality of input signals is the warning signal, the second logic circuit generates a fourth control signal for controlling the delay circuit to respond to the warning signal.

In one embodiment, the delay system further comprises a third logic circuit, the third logic circuit is coupled with the first logic circuit and the second logic circuit, wherein, when the third logic circuit receives the fourth control signal and does not receive the third control signal, the third logic circuit generates a sixth control signal for controlling the delay circuit to respond to the warning signal; and when the third logic circuit receives the third control signal, the third logic circuit generates a fifth control signal for resetting the delay circuit.

To solve the above-mentioned problem, another technical scheme adopted by the present disclosure is to provide a back-up safety circuit, comprising a delay system and an event response circuit, wherein the delay system receives a warning signal due to a safety event and sets a time delay, wherein when the delay system does not receive a first control signal indicating that a safety circuit has responded to the warning signal during the time delay, the delay system controls the event response circuit to respond to the warning signal; and when the delay system receives the first control signal during the time delay, the delay system controls the event response circuit not to respond to the warning signal.

In one embodiment, the delay system comprises a delay circuit and a first logic circuit, the delay circuit responds to the warning signal and outputs a second control signal to the first logic circuit after the time delay, wherein when the first logic circuit receives only the second control signal and does not receive the first control signal during the time delay, the first logic circuit generates a third control signal for controlling the event response circuit to respond to the warning signal; and when the first logic circuit receives the first control signal during the time delay, the first logic circuit does not generate the third control signal.

In one embodiment, the first logic circuit comprises an AND gate circuit, the first control signal comprises a low level signal, and the second control signal comprises a high level signal.

In one embodiment, the delay circuit generates a clock signal in response to the warning signal, the delay system further comprises a latch circuit, the latch circuit is connected between the first logic circuit and the event response circuit, the latch circuit latches the third control signal in response to the clock signal and then outputs a latched signal based on the third control signal to the event response circuit.

In one embodiment, the delay system further comprises a second logic circuit, the second logic circuit is connected to the delay circuit and configured to perform logical operations on a plurality of input signals, wherein when at least one of the plurality of input signals is the warning signal, the second logic circuit generates a fourth control signal for controlling the delay circuit to respond to the warning signal.

In one embodiment, the second logic circuit comprises an AND gate circuit, the warning signal comprises a high level signal, the fourth control signal comprises a low level signal, the delay system further comprises an inverter, the inverter inverts the plurality of input signals before the second logic circuit; the latch circuit outputs the latched signal to the delay circuit for resetting the delay circuit.

In one embodiment, the delay system further comprises a third logic circuit, the third logic circuit is coupled with the latch circuit and the second logic circuit, wherein, when the third logic circuit receives the fourth control signal and does not receive the latched signal, the third logic circuit generates a sixth control signal for controlling the delay circuit to respond to the warning signal; and when the third logic circuit receives the latched signal, the third logic circuit generates a fifth control signal for resetting the delay circuit.

In one embodiment, the third logic circuit comprises an OR gate circuit, the third control signal and the latched signal comprise a high level signal, the fourth control signal comprises a low level signal.

To solve the above-mentioned problem, a technical scheme adopted by the present disclosure is to provide an industrial robot safety control system, comprising a controller, a safety circuit, a delay system, an event response circuit and a plurality of motors, wherein the controller controls the plurality of motors to operate, the safety circuit is configured to respond to a warning signal due to an safety event and controls the plurality of motors to stop; the delay system receives a warning signal due to a safety event and sets a time delay, wherein when the delay system does not receive a first control signal indicating that a safety circuit has responded to the warning signal during the time delay, the delay system controls the event response circuit to respond to the warning signal; when the delay system receives the first control signal during the time delay, the delay system controls the event response circuit not to respond to the warning signal.

In one embodiment, the delay system is the same delay system as above-described.

The present disclosure provides an industrial robot safety control system, a back-up safety circuit and a safety module. The delay system receives the warning signal due to the safety event and set a time delay. When the delay system does not receive the first control signal indicating that the first safety circuit has responded to the warning signal during the time delay, the delay system controls the event response circuit to respond to the warning signal. When the delay system receives the first control signal indicating that the first safety circuit has responded to the warning signal during the time delay, the delay system controls the event response circuit not to respond to the warning signal. As a result, the back-up safety circuit and the main safety circuit operate alternatively, which can avoid the problem of common mode failure of the back-up safety mechanism.

DETAILED DESCRIPTION

The disclosure will now be described in detail with reference to the accompanying drawings and examples.

Figure 1:
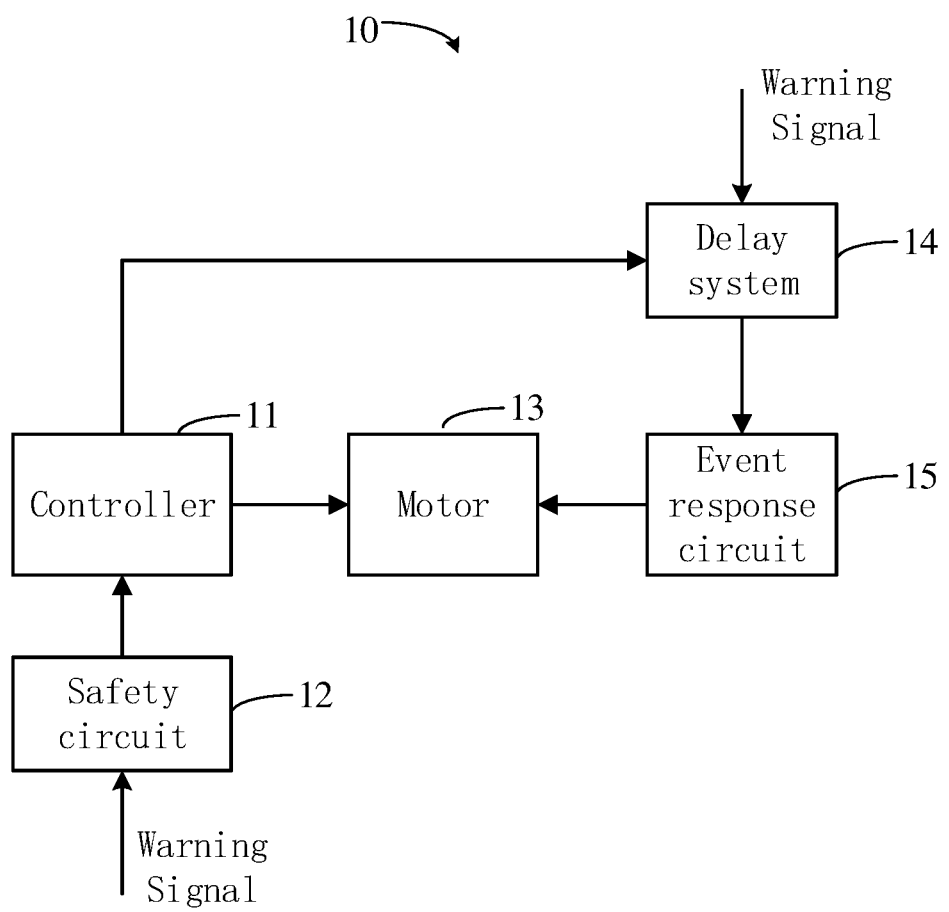
FIG. 1 is a diagram of an industrial robot safety control system according to an embodiment of the present disclosure.

Referring to FIG. 1, FIG. 1 is a diagram of an industrial robot safety control system according to an embodiment of the present disclosure. The system 10 may include a controller 11, a safety circuit 12, multiple motors 13, a delay system 14 and an event response circuit 15. The controller 11 may be connected to the safety circuit 12, the motors 13 and the delay system 14 respectively. The event response circuit 15 may be connected between the delay system 14 and the motors 13.

The controller 11 may control the multiple motors 13 to operate. The safety circuit 12 may control the multiple motors 13 to stop in response to a warning signal due to a safety event in the system. The delay system 14 may receive the warning signal due to the safety event and set a time delay. When the delay system 14 does not receive a first control signal indicating that the safety circuit 12 has responded to the warning signal during the time delay, the delay system 14 may control the event response circuit 15 to respond to the warning signal. When the delay system 14 receives the first control signal during the time delay, the delay system 14 may control the event response circuit 15 not to respond to the warning signal.

Figure 2:
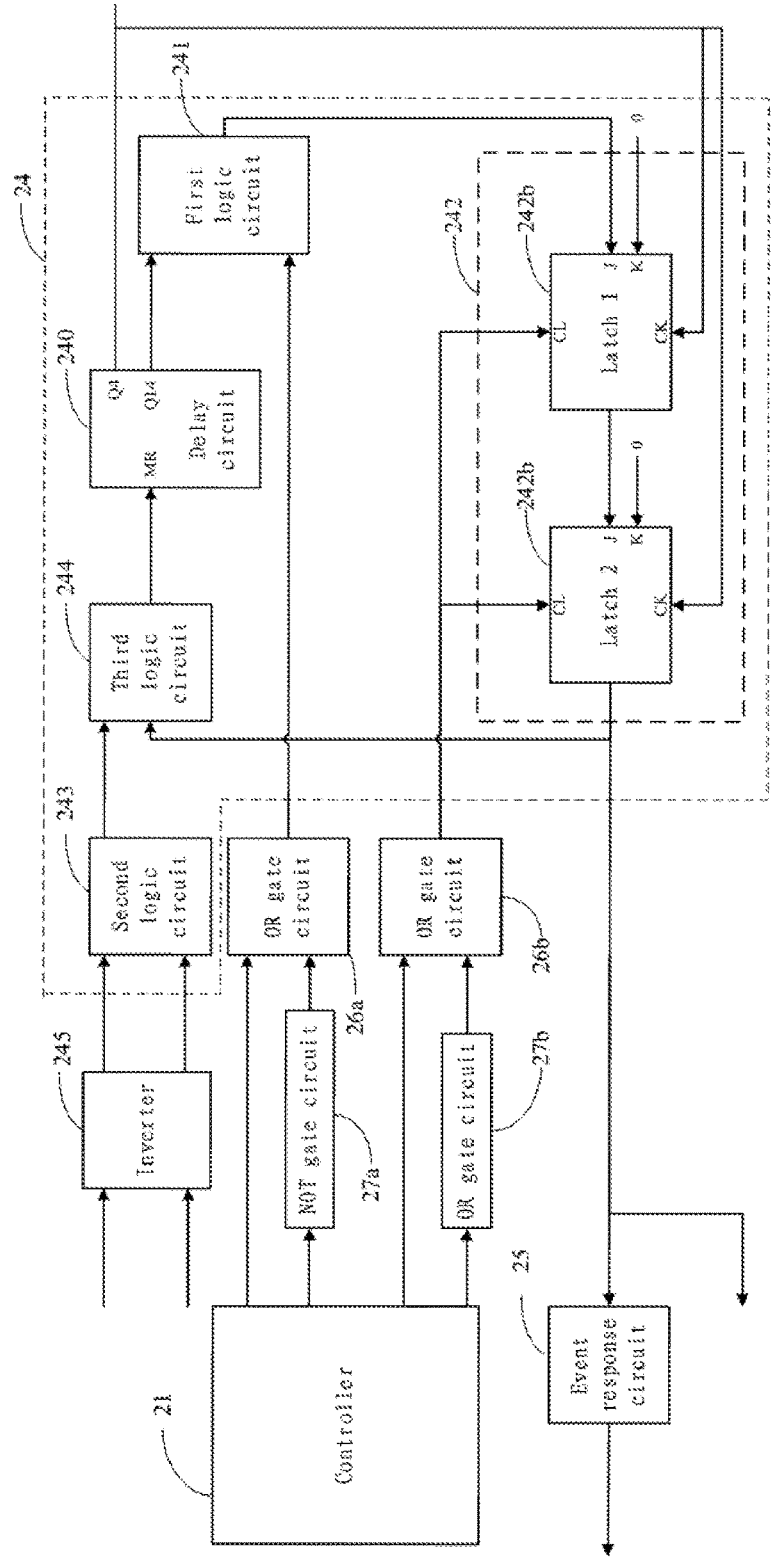
FIG. 2 is a block diagram of a back-up safety circuit of robot safety control system according to an embodiment of the present disclosure.

Referring to FIG. 2, FIG. 2 is a block diagram of a back-up safety circuit of robot safety control system according to an embodiment of the present disclosure. The back-up safety circuit may include a delay system 24 and an event response circuit 25. The controller 21 may be connected to a safety circuit12, motors13 and the delay system 24 respectively. The event response circuit 25 may be connected between the delay system 24 and the motors13.

Specifically, the delay system 24 may include a delay circuit 240, a first logic circuit 241, a latch circuit 242, a second logic circuit 243 and a third logic circuit 244.

The delay circuit 240 may respond to the warning signal generated in the system and output a second control signal after a pre-determined time. The first logic circuit 241 may receive respectively the first control signal indicating that the safety circuit 12 has responded to the warning signal during the pre-determined time and the second control signal, and then perform logical operations. When the first logic circuit 241 receives only the second control signal, the first logic circuit 241 may generate a third control signal involved to control the event response circuit 25 to respond to the warning signal. When the first logic circuit 241 receives the first control signal and the second control signal at the same time, the first logic circuit 241 may not generate the third control signal. In one embodiment, the first control signal may be a low level signal and the second control signal may be a high level signal.

The delay circuit 240 may generate a clock signal in response to the warning signal. The latch circuit 242 may be connected between the first logic circuit 241 and the event response circuit 25. The latch circuit 242 may operate in response to the clock signal to latch the third control signal and then output the latched signal to the event response circuit 25. The latch circuit 242 may also output the latched signal to the delay circuit 240 to reset the delay circuit 240. In one embodiment, the third control signal and the latched signal may each be a high level signal.

Specifically, the output port of the latch circuit 242 may be connected to the second input port of the third logic circuit 244 for transmitting the third control signal to the third logic circuit 244. The third logic circuit 244 may perform logical operations on an output signal of the second logic circuit 243 and the third control signal, and transmit the result to the delay circuit 240 so as to reset the delay circuit 240.

In addition, the latch circuit 242 may include a first latch 242a and a second latch 242b. The first input port of the first latch 242a may be connected to the output port of the first logic circuit 241. The output port of the first latch 242a may be connected to the first input port of the second latch 242b.

In this embodiment, the first latch 242a and the second latch 242b may both be a JK flip-flop. The first input port of each of the first latch 242a and the second latch 242b may both be the J port of the flip-flop while the K port of the each of the first latch 242a and the second latch 242b may be grounded.

The second logic circuit 243 may be connected to the delay circuit 240 and configured to perform logical operations on multiple input signals so as to generate a fourth control signal when at least one of the input signals is the warning signal. The fourth control signal may be involved to control the delay circuit 240 to respond to the warning signal.

The third logical circuit 244 may receive the third control signal and the fourth control signal, and perform logical operations. When the third logic circuit receives the third control signal, the third logic circuit 244 may generate a fifth control signal for resetting the delay circuit 240. When the third logic circuit 244 receives the fourth control signal and does not receive the third control signal, the third logic circuit 244 may generate a sixth control signal for controlling the delay circuit 240 to respond to the warning signal.

In this embodiment, the first logic circuit 241 may be a AND gate circuit, the second logic circuit 243 may be an AND gate circuit and the third logic circuit 244 may be an OR gate circuit.

In one embodiment, the input port of the second logic circuit 243 may be configured to receive the warning signal, and the output port may be connected to the first input port of the third logic circuit 244. The output port of the third logic circuit 244 may be connected to the input port of the delay circuit 240. The first output port of the delay circuit 240 may be connected to the clock input port of the latch circuit 242 while the second output port may be connected to the first input port of the first logic circuit 241.

The delay system 24 may further include an inverter 245. The inverter 245 may invert the multiple input signals before the multiple input signals are input to the second logic circuit 243.

Specifically, the signals input to the inverter 245 may include 17 signals which may be input to the second logic circuit 243 after being inverted by the inverter 245. Wherein, the warning signal may be a high level signal.

In the case that the multiple motors 13 of the system operate under the control of the controller 11, when the system operates normally, the 17 input signals may all be low level signals. After the input signals are processed by the inverter 245, the second logic circuit 243 and the third logic circuit 244 when passing therethrough, a high level signal may be provided to the input port of the delay circuit 240. The delay circuit 240 may be in a reset state in response to this high level signal where the first output port and the second output port may each output a low level signal. Correspondingly, the latch circuit 242 may also output a low level signal.

When a warning signal occurs in the system, i.e. at least one of the 17 input signals is a high level signal, a low level signal may be provided to the input port of the delay circuit 240 after the input signals are processed by the inverter 245, the second logic circuit 243 and the third logic circuit 244 when passing therethrough. The delay circuit 240 may start the time and output a clock signal to the clock input port CL of the latch circuit 242 through the first output port Q4 for triggering the latch circuit 242.

The delay circuit 240 may still output a low level signal through its second output port Q14 before the delay circuit 240 completes the time, i.e. during the pre-determined time delay. The first logic circuit 241 may receive the first control signal and the low level signal from the second output port Q14 of the delay circuit 240 and perform logical operations. When the first control signal is a high level signal, which means no action has been taken in response to the warning signal generated, the first logic circuit 241 may output a low level signal through its output port to the first input port J of the latch circuit 242. The latch circuit 242 may latch the received low level signal to the output port when being triggered.

When the delay circuit 240 completes the time after the pre-determined time delay, the first logic circuit 241 may still receive the high level signal from its second input port, at this time the second output port Q14 of the delay circuit 240 may output a high level signal. The first logic circuit 241 may perform logical operations on the high level output signal of the delay circuit and the high level signal received from its second input port to output a high level signal to the latch circuit 242. The latch circuit 242 may latch the received high level signal to the output port such that the event response circuit 25 may respond to the warning signal in response to the high level signal.

In this embodiment, the event response circuit 25 may be a relay configured to disable its coil so as to cut the power supply of the motors 13 in response to the high level signal.

When at least one of the 17 input signals is a high level signal, the inverter 245 and the second logic circuit 243 may form cooperatively a NOR gate which may process the 17 input signals to output a low level signal.

Before the delay circuit 240 completes the time, the second input port of the first logic circuit 241 may receive a low level signal which indicates that the safety circuit 12 has responded to the warning signal, at the moment the second output port Q14 of the delay circuit 240 may output a low level signal. The first logic circuit 241 may perform logical operations on the low level output signal of the delay circuit 240 and the low level signal received from its second input port to output a low level signal to the latch circuit 242. The latch circuit 242 may latch the received low level signal to the output port such that the event response circuit 25 may not respond to the warning signal in response to the low level signal.

In addition, the system 20 may further include an OR gate circuit 26a and a NOT gate circuit 27a. The first input port of the OR gate circuit 26a may be connected to the controller 21. The NOT gate circuit 27a may be connected between the controller 21 and the second input port of the OR gate circuit 26a. The output port of the OR gate circuit may be connected to the second input port of the first logic circuit 241. The controller 21 may generate a corresponding control signal based on whether the system has responded to the warning system. The OR gate circuit 26a and the NOT gate 27a may perform logical processing in regards to the control signal passing therethrough and transmit an output to the latch circuit 242.

The system 20 may further include an OR gate circuit 26b and a NOT gate circuit 27b. The first input port of the OR gate circuit 26b may be connected to the controller 21. The NOT gate circuit 27b may be connected between the controller 21 and the second input port of the OR gate circuit 26b. The output port of the OR gate circuit 26b may be connected to the input port CL of the latch circuit 242. The controller 21 may generate a corresponding reset signal based on whether the system has responded to the warning system. The OR gate circuit 26b and the NOT gate 27b may perform logical processing in regards to the reset signal passing therethrough and transmit an output to the latch circuit 242. The reset signal may be utilized for resetting the latch circuit 242.

Referring to FIG. 1 and FIG. 2, the present disclosure provides a safety module according to an embodiment. The safety module may include a first safety circuit and a second safety circuit. The first safety circuit and the second safety circuit may receive the warning signal at the same time. The second safety circuit may include a delay system and an event response circuit. The first safety circuit may refer to the safety circuit 12 shown in FIG. 1. The delay system may refer to the delay system 14 and the event response circuit may refer to the event response circuit 15. Alternatively, the delay system may refer to the delay system 24 and the event response circuit may refer to the event response circuit 25 as shown in FIG. 2.

The first safety circuit is configured to respond to the warning signal in real time. The delay system may define a time delay when having received the warning signal, wherein if the delay system does not receive a first control signal indicating that the first safety circuit has responded to the warning signal during the time delay, the delay system may control the event response circuit to respond to the warning signal.

The detailed description related to the first safety circuit and the second safety circuit can be found in FIGS. 1-2, and corresponding descriptions.

The present disclosure provides an industrial robot safety control system, a back-up safety circuit and a safety module. The delay system receives the warning signal due to the safety event and sets a time delay. When the delay system does not receive the first control signal indicating that the first safety circuit has responded to the warning signal during the time delay, the delay system controls the event response circuit to respond to the warning signal. When the delay system receives the first control signal indicating that the first safety circuit has responded to the warning signal during the time delay, the delay system controls the event response circuit not to respond to the warning signal. As a result, the present disclosure may avoid the problem of common mode failure of the back-up safety mechanism.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A safety module, comprising a first safety circuit and a second safety circuit, wherein the first safety circuit and the second safety circuit receive a warning signal at a same time;

the first safety circuit is configured to respond to the warning signal in real time;

the second safety circuit comprises a delay system and an event response circuit, the delay system sets a time delay when receiving the warning signal, wherein, when the delay system does not receive a first control signal indicating that the first safety circuit has responded to the warning signal during the time delay, the delay system controls the event response circuit to respond to the warning signal.

2. The safety module of claim 1, wherein the delay system comprises a delay circuit and a first logic circuit, the delay circuit responds to the warning signal and outputs a second control signal to the first logic circuit after the time delay, wherein when the first logic circuit receives only the second control signal and does not receive the first control signal during the time delay, the first logic circuit generates a third control signal for controlling the event response circuit to respond to the warning signal; and when the first logic circuit receives the first control signal during the time delay, the first logic circuit does not generate the third control signal.

3. The safety module of claim 2, wherein the delay system further comprises a second logic circuit, the second logic circuit is connected to the delay circuit and configured to perform logical operations on a plurality of input signals, wherein when at least one of the plurality of input signals is the warning signal, the second logic circuit generates a fourth control signal for controlling the delay circuit to respond to the warning signal.

4. The safety module of claim 3, wherein the delay system further comprises a third logic circuit, the third logic circuit is coupled with the first logic circuit and the second logic circuit, wherein, when the third logic circuit receives the fourth control signal and does not receive the third control signal, the third logic circuit generates a sixth control signal for controlling the delay circuit to respond to the warning signal; and when the third logic circuit receives the third control signal, the third logic circuit generates a fifth control signal for resetting the delay circuit.

5. A back-up safety circuit, comprising a delay system and an event response circuit, wherein the delay system receives a warning signal due to a safety event and sets a time delay, wherein when the delay system does not receive a first control signal indicating that a safety circuit has responded to the warning signal during the time delay, the delay system controls the event response circuit to respond to the warning signal; and when the delay system receives the first control signal during the time delay, the delay system controls the event response circuit not to respond to the warning signal.

6. The back-up safety circuit of claim 5, wherein the delay system comprises a delay circuit and a first logic circuit, the delay circuit responds to the warning signal and outputs a second control signal to the first logic circuit after the time delay, wherein when the first logic circuit receives only the second control signal and does not receive the first control signal during the time delay, the first logic circuit generates a third control signal for controlling the event response circuit to respond to the warning signal; and when the first logic circuit receives the first control signal during the time delay, the first logic circuit does not generate the third control signal.

7. The back-up safety circuit of claim 6, wherein the first logic circuit comprises an AND gate circuit, the first control signal comprises a low level signal, and the second control signal comprises a high level signal.

8. The back-up safety circuit of claim 6, wherein the delay circuit generates a clock signal in response to the warning signal, the delay system further comprises a latch circuit, the latch circuit is connected between the first logic circuit and the event response circuit, the latch circuit latches the third control signal in response to the clock signal and then outputs a latched signal based on the third control signal to the event response circuit.

9. The back-up safety circuit of claim 8, wherein the delay system further comprises a second logic circuit, the second logic circuit is connected to the delay circuit and configured to perform logical operations on a plurality of input signals, wherein when at least one of the plurality of input signals is the warning signal, the second logic circuit generates a fourth control signal for controlling the delay circuit to respond to the warning signal.

10. The back-up safety circuit of claim 9, wherein the second logic circuit comprises an AND gate circuit, the warning signal comprises a high level signal, the fourth control signal comprises a low level signal, the delay system further comprises an inverter, the inverter inverts the plurality of input signals before the second logic circuit; the latch circuit outputs the latched signal to the delay circuit for resetting the delay circuit.

11. The back-up safety circuit of claim 10, wherein the delay system further comprises a third logic circuit, the third logic circuit is coupled with the latch circuit and the second logic circuit, wherein, when the third logic circuit receives the fourth control signal and does not receive the latched signal, the third logic circuit generates a sixth control signal for controlling the delay circuit to respond to the warning signal; and when the third logic circuit receives the latched signal, the third logic circuit generates a fifth control signal for resetting the delay circuit.

12. The back-up safety circuit of claim 11, wherein the third logic circuit comprises an OR gate circuit, the third control signal and the latched signal comprise a high level signal, the fourth control signal comprises a low level signal.

13. An industrial robot safety control system, comprising a controller, a safety circuit, a delay system, an event response circuit and a plurality of motors, wherein the controller controls the plurality of motors to operate, the safety circuit is configured to respond to a warning signal due to an safety event and controls the plurality of motors to stop; the delay system receives a warning signal due to a safety event and sets a time delay, wherein when the delay system does not receive a first control signal indicating that a safety circuit has responded to the warning signal during the time delay, the delay system controls the event response circuit to respond to the warning signal; and when the delay system receives the first control signal during the time delay, the delay system controls the event response circuit not to respond to the warning signal.

14. The industrial robot safety control system of claim 13, wherein the delay system comprises a delay circuit and a first logic circuit, the delay circuit responds to the warning signal and outputs a second control signal to the first logic circuit after the time delay, wherein when the first logic circuit receives only the second control signal and does not receive the first control signal during the time delay, the first logic circuit generates a third control signal for controlling the event response circuit to respond to the warning signal; and when the first logic circuit receives the first control signal during the time delay, the first logic circuit does not generate the third control signal.

15. The industrial robot safety control system of claim 14, wherein the first logic circuit comprises an AND gate circuit, the first control signal comprises a low level signal, the second control signal comprises a high level signal.

16. The industrial robot safety control system of claim 14, wherein the delay circuit generates a clock signal in response to the warning signal, the delay system further comprises a latch circuit, the latch circuit is connected between the first logic circuit and the event response circuit, the latch circuit latches the third control signal in response to the clock signal and then outputs a latched signal based on the third control signal to the event response circuit.

17. The industrial robot safety control system of claim 16, wherein the delay system further comprises a second logic circuit, the second logic circuit is connected to the delay circuit and configured to perform logical operations on a plurality of input signals, wherein when at least one of the plurality of input signals is the warning signal, the second logic circuit generates a fourth control signal for controlling the delay circuit to respond to the warning signal.

18. The industrial robot safety control system of claim 17, wherein the second logic circuit comprises an AND gate circuit, the warning signal comprises a high level signal, the fourth control signal comprises a low level signal, the delay system further comprises an inverter, the inverter inverts the plurality of input signals before the second logic circuit; the latch circuit outputs the latched signal to the delay circuit for resetting the delay circuit.

19. The industrial robot safety control system of claim 18, wherein the delay system further comprises a third logic circuit, the third logic circuit is coupled with the latch circuit and the second logic circuit, wherein, when the third logic circuit receives the fourth control signal and does not receive the latched signal, the third logic circuit generates a sixth control signal for controlling the delay circuit to respond to the warning signal; and when the third logic circuit receives the latched signal, the third logic circuit generates a fifth control signal for resetting the delay circuit.

20. The industrial robot safety control system of claim 19, wherein the third logic circuit comprises an OR gate circuit, the third control signal and the latched signal comprise a high level signal, the fourth control signal comprises a low level signal.

\* \* \* \* \*